United States Patent
Lee et al.

(10) Patent No.: US 8,630,280 B2
(45) Date of Patent: Jan. 14, 2014

(54) METHOD AND USER EQUIPMENT FOR TRANSMITTING FEEDBACK INFORMATION

(75) Inventors: Wook Bong Lee, Gyeonggi-do (KR); Bin Chul Ihm, Gyeonggi-do (KR); Jin Young Chun, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 265 days.

(21) Appl. No.: 13/045,711

(22) Filed: Mar. 11, 2011

(65) Prior Publication Data

US 2011/0222521 A1  Sep. 15, 2011

Related U.S. Application Data

(60) Provisional application No. 61/313,783, filed on Mar. 14, 2010.

(30) Foreign Application Priority Data

Jan. 24, 2011  (KR) .................. 10-2011-0006805

(51) Int. Cl.
  *H04J 11/00* (2006.01)
  *H04W 4/00* (2009.01)
  *H04B 7/216* (2006.01)

(52) U.S. Cl.
  USPC ............ 370/342; 370/210; 370/328; 370/338

(58) Field of Classification Search
  None
  See application file for complete search history.

(56) References Cited

U.S. PATENT DOCUMENTS

| | | | | |
|---|---|---|---|---|
| 2007/0115796 | A1* | 5/2007 | Jeong et al. | 370/203 |
| 2008/0080469 | A1* | 4/2008 | Kolding et al. | 370/342 |
| 2008/0212464 | A1* | 9/2008 | Kim et al. | 370/210 |
| 2010/0220675 | A1 | 9/2010 | Chun et al. | |

FOREIGN PATENT DOCUMENTS

| | | |
|---|---|---|
| KR | 10-2009-0039578 A | 4/2009 |
| KR | 10-2009-0034527 A | 8/2009 |

OTHER PUBLICATIONS

Notice of Allowance issued in Korean Patent Application No. 10/2011/0006805 dated Nov. 20, 2012.

* cited by examiner

*Primary Examiner* — Faruk Hamza
*Assistant Examiner* — Diane Lo
(74) *Attorney, Agent, or Firm* — Morgan, Lewis & Bockius LLP

(57) ABSTRACT

A method and User Equipment (UE) for transmitting feedback information are disclosed. The UE feeds back M best subbands to a Base Station (BS). Especially, the UE feeds back indication information indicating a combination of the M best subbands from among combinations each having M subbands produced out of a maximum number of subbands that can be allocated. Hence, coding of the feedback information is simplified.

8 Claims, 7 Drawing Sheets

METHOD AND USER EQUIPMENT FOR TRANSMITTING FEEDBACK INFORMATION

CROSS-REFERENCE TO RELATED APPLICATIONS

Pursuant to 35 U.S.C. §119(e), this application claims the benefit of U.S. Provisional Application Ser. No. 61/313,783 filed on Mar. 14, 2010, which is hereby incorporated by references as if fully set forth herein.

Pursuant to 35 U.S.C. §119(a), this application also claims the benefit of the Korean Patent Application No. 10-2011-0006805 filed on Jan. 24, 2011, which is hereby incorporated by reference as if fully set forth herein.

BACKGROUND OF THE INVENTION

1. Field of the Invention

The present invention relates to a wireless communication system, and more particularly, to a method and apparatus for transmitting a feedback polling request to a User Equipment (UE) and a method and apparatus for transmitting feedback information to a Base Station (BS).

2. Discussion of the Related Art

In a conventional broadband wireless access system, a receiver transmits feedback information to a transmitter in the following manner.

By and large, transmission of feedback information from a UE to a BS is polling-based or contention-based in a typical broadband wireless access system.

According to the polling-based scheme, the UE feeds back information to the BS, for data requested by polling from the BS. That is, upon receipt of a feedback polling request from the BS, the UE transmits feedback data to the BS. Compared to the polling-based scheme, the contention-based scheme is characterized in that a plurality of UEs transmit feedback data on one uplink channel to the BS in a contention-based manner without receiving a feedback request from the BS.

In an Institute of Electrical and Electronics Engineers (IEEE) 802.16m system under recent standardization, a BS may transmit a feedback polling request to a UE in order to avoid contention between a plurality of UEs. Upon receipt of the feedback polling request from the BS, the UE transmits feedback information to the BS. Therefore, there exists a need for specifying a method for transmitting a feedback polling request to a UE by a BS and a method for transmitting feedback information to a BS by a UE.

SUMMARY OF THE INVENTION

Accordingly, the present invention is directed to a method and a user equipment for transmitting feedback information that substantially obviate one or more problems due to limitations and disadvantages of the related art.

An object of the present invention is to provide a method and apparatus for transmitting feedback information to a Base Station (BS).

Another object of the present invention is to provide a method and apparatus for transmitting feedback information indicating one or more best subbands to a BS.

A further object of the present invention is to provide a method and apparatus for requesting feedback information to a User Equipment (UE).

It is to be understood that technical objects to be achieved by the present invention are not limited to the aforementioned technical objects and other technical objects which are not mentioned will be apparent from the following description to the person with an ordinary skill in the art to which the present invention pertains.

To achieve these objects and other advantages and in accordance with the purpose of the invention, as embodied and broadly described herein, a method for transmitting feedback information to a BS at a UE in a wireless communication system includes receiving a feedback polling request from the BS, and transmitting a feedback message in response to the feedback polling request to the BS. The feedback polling request includes number information indicating the number of subbands, and the feedback message includes indication information for indicating M best subbands selected from among N subbands, N being a maximum number of subbands that can be allocated, and the indication information indicates a combination of the M best subbands from among $_NC_M$ combinations.

In another aspect of the present invention, a UE for transmitting feedback information to a BS in a wireless communication system includes a receiver configured to receive a downlink signal from the BS, a transmitter configured to transmit an uplink signal to the BS, and a processor, operatively coupled to the receiver and the transmitter, configured to control of the receiver and the transmitter. The processor is configured to control the receiver to receive a feedback polling request from the BS and control the transmitter to transmit a feedback message in response to the feedback polling request to the BS. The feedback polling request includes number information indicating the number of subbands M, and the feedback message includes indication information for indicating M best subbands selected from among N subbands, N being a maximum number of subbands that can be allocated, and the indication information indicates a combination of the M best subbands from among $_NC_M$ combinations.

In each aspect of the present invention, the indication information may be encoded to a size of $\mathrm{Ceil}\{\log_2(_NC_M)\}$.

The maximum number of subbands, N may depend on a Fast Fourier Transform (FFT) size and N may be 4, 10 and 21, respectively for 512-FFT, 1024-FFT, and 2048-FFT.

The number information may indicate one of all subbands, one subband, 6 subbands, and 12 subbands and if the number information indicates all subbands, the feedback message may not include the indication information.

The aforementioned technical solutions are only a part of the embodiments of the present invention, and various modifications to which technical features of the present invention are applied could be understood by the person with ordinary skill in the art to which the present invention pertains, based on the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a Base Station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a BS means a fixed station that performs communication with a UE and/or another BS, and exchanges various kinds of data and control information with the UE and another BS. The BS may be referred to as another terminology such as an evolved-Node B (eNB), a Base Transceiver System (BTS), an Access Point (AP), and an Advanced Base Station (ABS).

A wireless communication system 100 to which embodiments of the present invention apply may include a plurality of BSs. Each BS provides communication services to a UE or UEs located in its specific geographical area (generally, referred to as a cell). A cell may be further divided into a plurality of smaller areas. These smaller areas may be called cells, sectors or segments.

Figure 1:
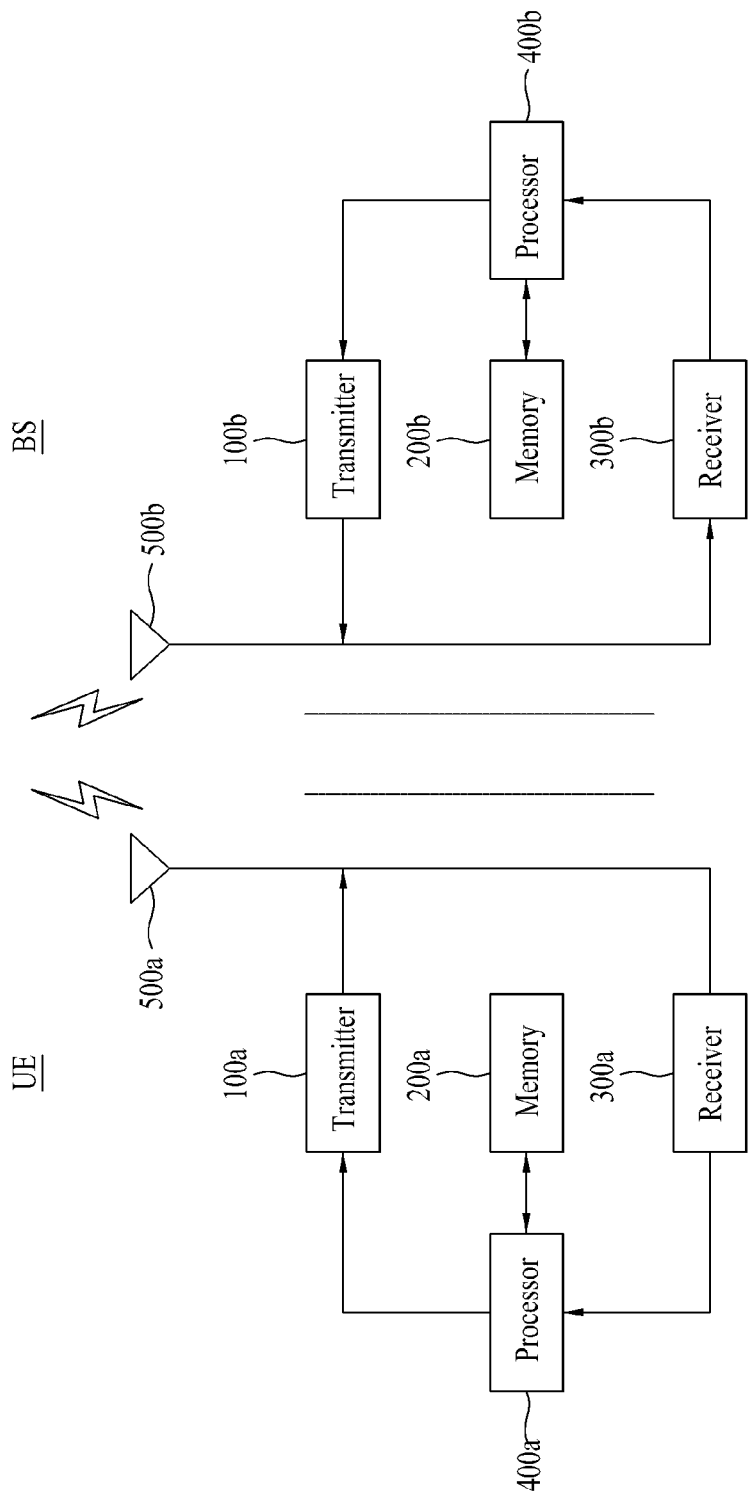
FIG. 1 is a block diagram of a User Equipment (UE) and a Base Station (BS) for implementing the present invention.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information.

Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
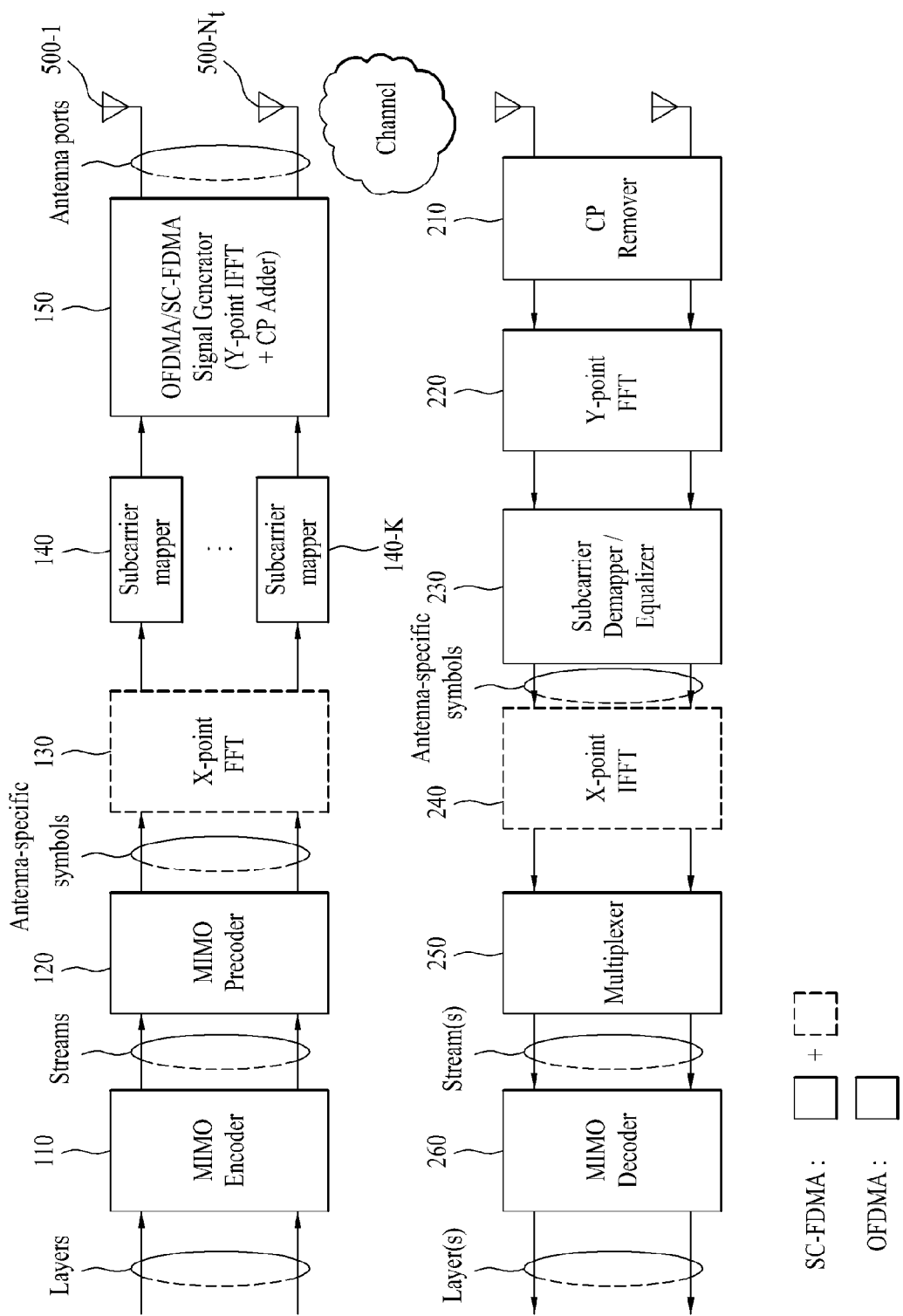
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the Orthogonal Frequency Division Multiple Access (OFDMA) transmitters 100a and 100b includes a MIMO encoder 110, a MIMO precoder 120, subcarrier mappers 140-1 to 140-K, and an OFDMA signal generator(s) 150. Each of the transmitters 100a and 100b is connected to $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The transmission data stream input to the MIMO encoder 110 may be generated by subjecting a data block received from a MAC layer to various signal processes such as channel encoding, interleaving, and scrambling. The data stream may be referred to as a codeword or a layer and is equivalent to a data block from the MAC layer. The data block from the MAC layer is referred to as a transport block. The modulation scheme may be, but not limited to, any of m-Phase Shift Keying (m-PSK) and m-Quadrature Amplitude Modulation (m-QAM). For modulating the coded data, the MIMO encoder 110 may have an independent modulation module. In the mean time, the MIMO encoder 110 may define MIMO streams of the input symbols such that the MIMO precoder 120 can distribute antenna-specific symbols to corresponding antenna paths. A MIMO stream refers to an information path input to the MIMO precoder 120, and the information path before the MIMO precoder 120 may be referred to as a virtual antenna or a MIMO stream. To define the MIMO streams of the symbols, the MIMO encoder 110 may be provided with a MIMO stream mapper configured as an independent module.

The MIMO precoder 120 outputs antenna-specific symbols to the subcarrier mappers 140-1 to 140-K by processing the received symbols in accordance with a MIMO scheme according to the multiple transmission antennas 500-1 to 500-$N_t$. Mapping of the MIMO streams to the antennas 500-1 to 500-$N_t$ is performed by the MIMO precoder 120. Specifically, the MIMO precoder 120 multiplies the output x of the MIMO encoder 110 by an $N_t \times M_t$ precoding matrix W. The output of the MIMO precoder 120 may be represented as an $N_t \times N_F$ matrix z.

The subcarrier mappers 140-1 to 140-K allocate the antenna-specific symbols to appropriate subcarriers and multiplex them according to UEs. In the mean time, the subcarrier mappers 140-1 to 140-K may include a Logical Resource Unit (LRU) allocation block (not shown) for dividing the modulated symbols into LRU sized segments and allocating each segment to the LRU. The subcarrier mappers 140-1 to 140-K can include a mapping block (not shown) for mapping the LRU into burst data. The data burst is allocated to a Physical Resource Unit (PRU) in a physical frequency domain. Accordingly, the subcarrier mappers 140-1 to 140-K serve to map the modulated data into subcarriers in accordance with a mapping relation between the LRU and the PRU.

The OFDMA signal generator(s) 150 output OFDM symbols by modulating the antenna-specific symbols according to an OFDM modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiver through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters.

More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, a Single Carrier Frequency Division Multiple Access (SC-FDMA) transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 1 and FIG. 2 that each of the transmitters 110a and 100b includes the MIMO encoder 110, the MIMO precoder 120, the subcarrier mappers 140-1 to 140-K, and the OFDMA/SC-FDMA signal generators 150, the processors 400a and 400b of the transmitter may include the MIMO encoder 110, the MIMO precoder 120, the subcarrier mappers 140-1 to 140-K, and the OFDMA/SC-FDMA signal generators 150. Likewise, although it has been described in FIG. 1 and FIG. 2 that each of the receivers 300a and 300b includes the signal recoverer, the multiplexer, and the channel demodulator, the processors 400a and 400b of the receiver may include the signal recoverer, the multiplexer, and the channel demodulator. Hereinafter, for convenience of description, the MIMO encoder 110, the MIMO precoder 120, the subcarrier mappers 140-1 to 140-K, and the OFDMA/SC-FDMA signal generators 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generators 150. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the MIMO encoder 110, the MIMO precoder 120, the subcarrier mappers 140-1 to 140-K, and the OFDMA/SC-FDMA signal generators 150 are included in the processors 400a and 400b and the case where the signal recoverer, the multiplexer, and the channel demodulator are included in the processors 400a and 400b.

Figure 3:
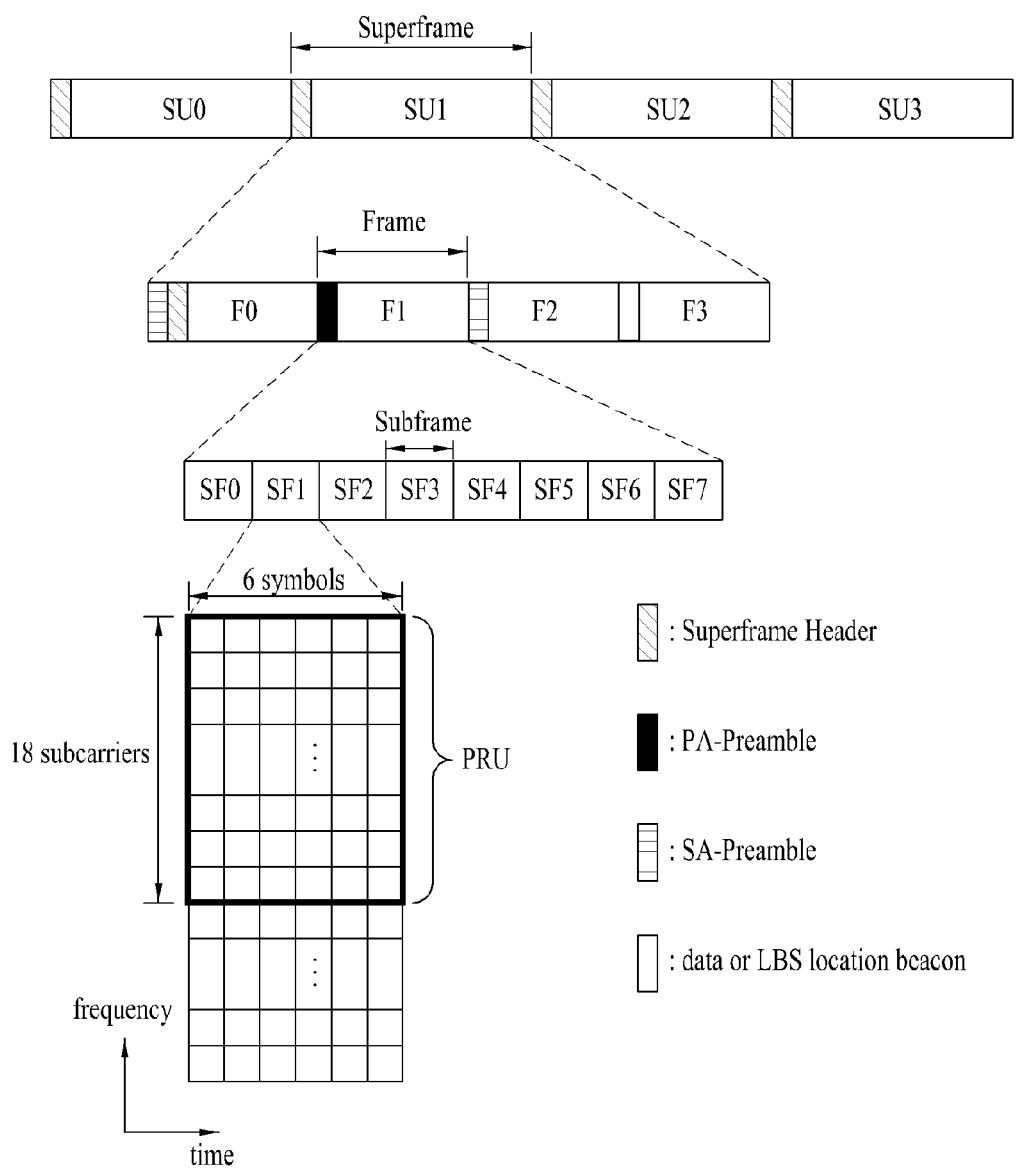
FIG. 3 illustrates an exemplary structure of a radio frame in an Institute of Electrical and Electronics Engineers (IEEE) 802.16m system.

FIG. 3 illustrates an exemplary structure of a radio frame of IEEE 802.16m used in the wireless communication system. The radio frame structure can be applied to a Frequency Division Duplex (FDD) mode, a Half Frequency Division Duplex (H-FDD) mode, and a Time Division Duplex (TDD) mode.

Referring to FIG. 3, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a SuperFrame Header (SFH). The SFH carries essential system parameters and system configuration information. The SFH can be located within the first subframe of the superframe. The SFH can be classified into a Primary SFH (P-SFH) and a Secondary SFH (S-SFH). The P-SFH is transmitted per superframe. The S-SFH may be transmitted per superframe. The SFH can include a broadcast channel.

One superframe carries up to four downlink synchronization signals. A downlink synchronization signal is used for downlink synchronization. In an IEEE 802.16m system, for example, a downlink synchronization signal includes a primary synchronization signal with a Primary Advanced preamble (PA-preamble) and a secondary synchronization signal with a Secondary Advanced preamble (SA-preamble). Each of the PA-preamble, the SA-preamble, and a DL LBS location beacon is located in the first symbol of a frame in the FDD mode and the TDD mode. The PA-preamble delivers information about a system bandwidth and a carrier configuration. Thus a UE may acquire the system bandwidth and carrier configuration information from the PA-preamble. The SA-preamble carries a cell Identifier (ID) of a BS. The SA-preamble is located at the first symbols of the first and third frames in a superframe, thus can be accumulated twice. A UE may detect the cell ID of the BS or perform cell scanning during handover, using the SA-preamble twice transmitted in one superframe.

Specifically, the PA-preamble resides in the first symbol of the second frame F1 in a superframe. The SA-preamble is carried in the first symbols of other two frames F0 and F2 in the superframe. If the superframe is used for the purpose of location measurement for DL LBS, the DL LBS location beacon can be transmitted in the last frame F3 of the superframe. Otherwise, data can be transmitted in the last frame F3 of the superframe.

One frame can include a certain number of subframes. For a 5/10/20 MHz system bandwidth, one frame may include eight subframes SF0 to SF7. For an 8.75 MHz system bandwidth, one subframe may include seven subframes SF0 to SF6. For a 7 MHz system bandwidth, one subframe may include six subframes SF0 to SF5. The subframe is allocated for downlink or uplink transmission. The frame can be configured differently depending on duplex modes. For example, since downlink transmission and uplink transmission are identified by frequency in the FDD mode, one frame includes either downlink subframes or uplink subframes. In the FDD mode, for the system bandwidth of 5/10/20 MHz, the eight subframes of each frame are numbered from 0 to 7. An idle time can exist at the end of each frame. On the other hand, since downlink transmission and uplink transmission are identified by time in the TDD mode, subframes within the frame are classified into downlink subframes and uplink subframes. For a system bandwidth of 5/10/20 MHz, for example, n downlink subframes out of eight subframes are indexed from 0 to n−1 and the remaining (8−n) uplink subframes are indexed from 0 to (8−n)−1 in each frame.

A subframe is a unit of a Transmission Time Interval (TTI). In other words, one TTI is defined by one or more subframes. In general, a basic TTI is set to one subframe. The TTI means a time interval during which a physical layer transmits coded packets through a radio interface. Accordingly, one subframe or a plurality of neighboring subframes can be used for transmission of data packets.

A subframe includes a plurality of OFDMA symbols in the time domain and a plurality of subcarriers in the frequency domain. The OFDMA symbols may be referred to as OFDMA symbols or SC-FDMA symbols depending on a multiplexing access scheme. The number of OFDMA symbols in a subframe may vary depending on a channel bandwidth and a CP length. The type of a subframe can be identified depending on the number of OFDMA symbols included in the subframe. For example, subframe type-1 includes six OFDMA symbols, subframe type-2 includes seven OFDMA symbols, subframe type-3 includes five OFDMA symbols, and subframe type-4 includes nine OFDMA symbols. A frame may include one type of subframes or different types of subframes. For the convenience' sake of description, the embodiments of the present invention will be described in the context of subframe type-1 including six OFDM symbols. However, it is to be noted that the embodiments of the present invention, which will be described later, are also applicable to the other types of subframes in the same manner.

In the frequency domain, an OFDMA symbol includes a plurality of subcarriers and the number of subcarriers is determined according to the size of FFT. The subcarriers may be classified into data subcarriers for data transmission, pilot subcarriers for channel estimation, and null subcarriers for a guard band and a DC component. Parameters for the OFDMA symbols include, for example, BW, $N_{used}$, n, G, etc. The BW is a nominal channel bandwidth. $N_{used}$ is the number of subcarriers used for signal transmission. Also, n is a sampling factor that determines a subcarrier spacing and a useful symbol time together with BW and $N_{used}$. G is a ratio between a CP time and a useful time.

In the frequency domain, resources can be grouped in a predetermined number of subcarriers. A group including a predetermined number of subcarriers within one subframe is referred to as a Resource Unit (RU).

An RU is a basic unit of resource allocation. A basic resource allocation unit is referred to as a Logical Resource Unit (LRU) in a logical frequency domain and as a Physical Resource Unit (PRU) in a physical frequency domain. PRUs are mapped to LRUs by frequency permutation. Permutation means a process of mapping predetermined physical resources to logical resources.

Figure 4:
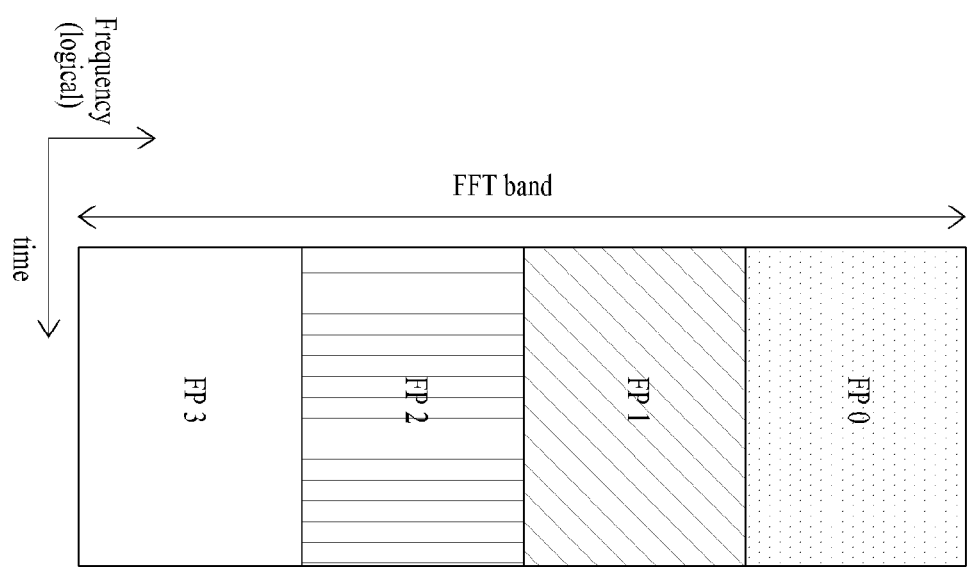
FIG. 4 is a conceptual view illustrating mapping of physical frequency resources to logical frequency resources through frequency permutation.
Figure 4:
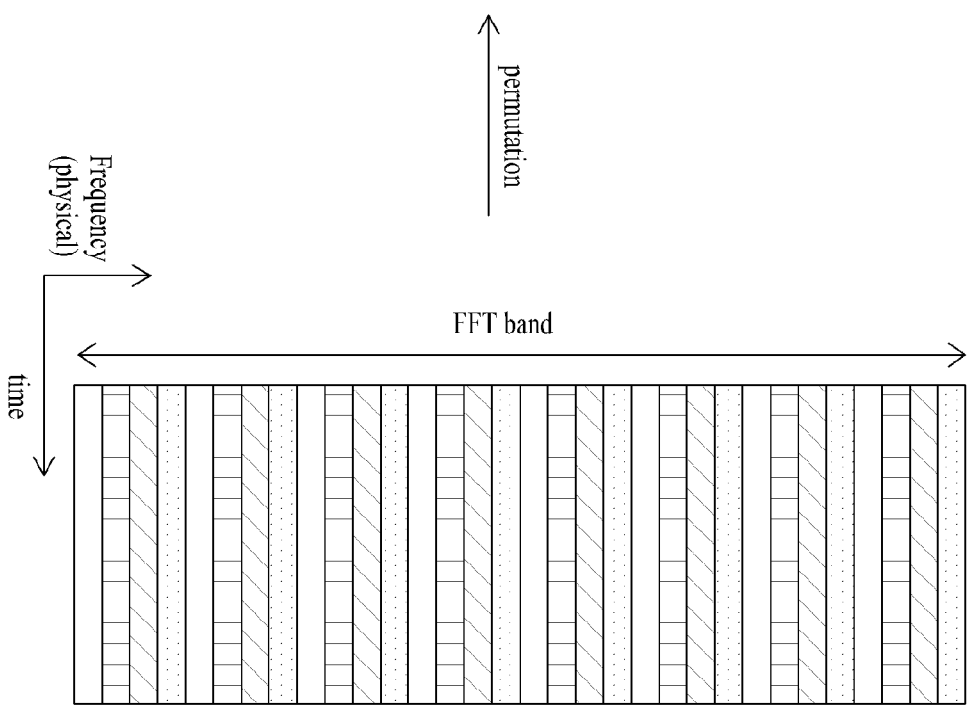

FIG. 4 is a conceptual view illustrating a mapping process of mapping physical frequency resources to logical frequency resources through permutation. In case of frequency permutation, transport signals are distributed along the frequency axis in a given bandwidth as permutation is applied to frequency resources on the frequency axis. Accordingly, it can be prevented that all of the transport signals are damaged, even though the channel status of a specific frequency in the given bandwidth is not good. Frequency permutation is classified into distributed permutation and localized permutation according to permutation units. Physical resources are mapped to logical resources in units of an RU in the distributed permutation, whereas physical resources are mapped to logical resources in units of a predetermined number of consecutive RUs in the localized permutation.

A subframe includes a plurality of PRUs in the frequency domain. Each PRU includes a plurality of consecutive OFDMA symbols in the time domain and a plurality of consecutive subcarriers in the frequency domain. For example, the number of OFDMA symbols $N_{sym}$ in the PRU may be equal to the number of OFDMA symbols included in the subframe. In the mean time, the number of subcarriers within the PRU may be 18. In this case, the PRU includes 6 OFDM symbols×18 subcarriers. The PRU may be a Distributed Resource Unit (DRU) or a Contiguous Resource Unit (CRU) depending on a resource allocation type. A basic permutation unit of an uplink DRU is a tile of 6 subcarriers by $N_{sym}$ symbols. A basic permutation unit of a downlink DRU is a tone-pair that includes two subcarriers and one symbol. In case of subframe type-1, one PRU includes 108 tones. A tone may also be referred to as a Resource Element (RE). Contiguous Logical Resource Units (CLRUs), also known as localized logical resource units, are obtained through direct mapping of CRUs. Two types of CLRUs, subband LRUs and miniband LRUs are supported according to two types of CRUs, subband-based CRUs and miniband-based CRUs, respectively.

A subframe can be divided into at least one Frequency Partition (FP) in the frequency domain. The FP can be used for Fractional Frequency Reuse (FFR). Each FP includes one or more PRUs. Distributed resource allocation and/or contiguous resource allocation can be applied to each FP. An LRU is a basic logical unit for distributed resource allocation and contiguous resource allocation. A Logical Distributed Resource Unit (LDRU) includes a plurality of subcarriers (Sc) distributed within a frequency partition. The LDRU has the same size as that of the PRU. The LDRU is also referred to as a Distributed LRU (DLRU). A Logical Contiguous Resource Unit (LCRU) includes contiguous subcarriers (Sc). The LCRU has the same size as that of the PRU. The LCRU is also referred to as a CLRU.

A system bandwidth may be divided into subbands and/or minibands, each including a predetermined number of RUs. A subband includes $N_1$ (e.g. 4) consecutive PRUs and a miniband includes $N_2$ (e.g. 1) consecutive PRUs. Because the number of subcarriers in a specific frequency bandwidth varies depending on an FFT size, the number of subbands and/or minibands included in the frequency band also depends on the FFT size.

Subbands are suitable for frequency selective allocations as they provide a contiguous allocation of PRUs in frequency. Minibands are suitable for frequency diverse allocation and are permuted in frequency. Let the number of subbands be denoted by $K_{SB}$. Then the number of PRUs allocated to subbands is denoted by $L_{SB}$, where $L_{SB}=N1 \cdot K_{SB}$. The value of $K_{SB}$ depends on an FFT size and is determined by a field called Downlink Subband Allocation Count (DSAC) carried in an SFH. The remaining PRUs are allocated to minibands. When the total number of PRUs is denoted by $N_{PRU}$, the maximum number of subbands that can be included in a specific system bandwidth, $N_{sub}$ is computed by $$N_{sub} = \lfloor N_{PRU}/N_1 \rfloor \quad \text{[Formula 1]}$$

Table 1 through Table 3 illustrate mapping between DSAC and $K_{SB}$ for 2048-FFT, 1024-FFT and 512-FFT, respectively.

TABLE 1

Mapping between DSAC and $K_{SB}$ for 2048 FFT size

| DSAC | Number of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | NA. |
| 23 | NA. |
| 24 | NA. |
| 25 | NA. |
| 26 | NA. |
| 27 | NA. |
| 28 | NA. |
| 29 | NA. |
| 30 | NA. |
| 31 | NA. |

TABLE 2

Mapping between DSAC and $K_{SB}$ for 1024 FFT size

| DSAC | Number of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | NA. |
| 12 | NA. |
| 13 | NA. |
| 14 | NA. |
| 15 | NA. |

TABLE 3

Mapping between DSAC and $K_{SB}$ for 512 FFT size

| DSAC | Number of subbands allocated ($K_{SB}$) |
|---|---|
| 0 | 0 |
| 1 | 1 |
| 2 | 2 |
| 3 | 3 |
| 4 | 4 |
| 5 | NA. |
| 6 | NA. |
| 7 | NA. |

Referring to Table 1, Table 2 and Table 3; the maximum number of subbands $N_{sub}$ is 21, 10 and 4 for 2048-FFT, 1024-FFT, and 512-FFT, respectively.

The aforementioned structure is only exemplary. Accordingly, various modifications can be made to the length of a superframe, the number of subframes included in the superframe, the number of OFDMA symbols included in a subframe, and parameters of OFDMA symbols. For example, the number of subframes included in a frame may vary depending on the channel bandwidth and the CP length.

Figure 5:
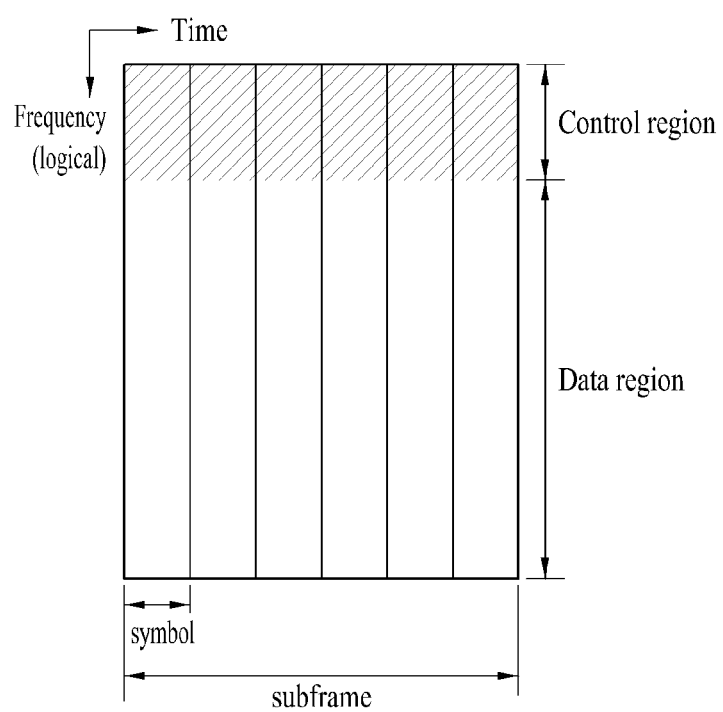
FIG. 5 illustrates an exemplary downlink subframe structure in the IEEE 802.16m system.

FIG. 5 illustrates an exemplary downlink subframe structure in an IEEE 802.16m system.

In the IEEE 802.16m system, an A-MAP is transmitted in every downlink subframe. When Fractional Frequency Reuse (FFR) is applied to the downlink subframe, the LRUs of the downlink subframe are divided into one or more Frequency Partitions (FPs). An A-MAP may be allocated to a reuse-1 partition and/or a power-boosted reuse-3 partition.

The A-MAP carries service control information. The service control information includes user-specific control information and non-user-specific control information. The user-specific control information is further divided into assignment information, Hybrid Automatic Repeat reQuest (HARQ) feedback information, and power control information, and they are transmitted in an assignment A-MAP, HARQ feedback A-MAP, and power control A-MAP, respectively. All the A-MAPs share a region of physical resources called A-MAP region.

A-MAP regions are present in all downlink subframes. Downlink and uplink data corresponding to an A-MAP region may occupy resources in any FP in a subframe or a frame.

Figure 6:
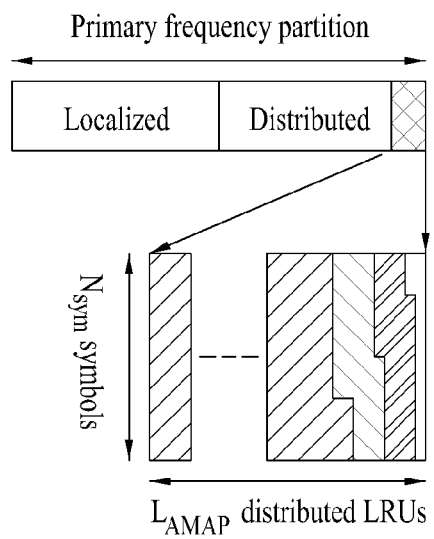
FIG. 6 illustrates an exemplary structure of an Advanced-MAP (A-MAP) region within a primary frequency partition in the IEEE 802.16m system.

FIG. 6 illustrates an exemplary structure of an A-MAP region within a primary FP in the IEEE 802.16m system.

According to IEEE 802.16 standards that have been defined so far, an A-MAP region is located in predetermined DLRUs within a primary FP such as a reuse-1 partition or a power-boosted reuse-3 partition.

For example, in downlink subframes other than the first subframe of a superframe, an A-MAP region is comprised of the first $L_{AMAP}$ DLRUs in a frequency partition. In the first downlink subframe of a superframe, the A-MAP region is comprised of $L_{AMAP}$ DLRUs after the first $N_{SFH}$ DLRUs occupied by an SFH. The resources occupied by each A-MAP may vary depending on a system configuration and a scheduler operation.

Each A-MAP carries a basic element for service control, A-MAP Information Element (IE). Among A-MAPs, an assignment A-MAP may carry a feedback polling A-MAP IE used a BS to schedule feedback transmission of a UE. That is, the BS may schedule the feedback transmission of the UE by the feedback polling A-MAP IE. For instance, the BS may allocate an uplink feedback channel to active subcarriers of the UE. The following table lists IEs that the BS uses in order to schedule MIMO feedback transmission of a UE.

TABLE 4

| Syntax | Size (bits) | Notes |
|---|---|---|
| Feedback_Polling_A-MAP_IE( ){ | | |
|     A-MAP IE Type | 4 | Feedback Polling A-MAP IE |
|     Polling_sub_type | 1 | 0b0: uplink resource allocation or de-allocation. |
| | | 0b1: feedback mode allocation or de-allocation. |
|     ... | | |
|     Allocation Duration (d) | 3 | The allocation is valid for $2^{(d-1)}$ superframes starting from the superframe defined by allocation relevance. If d == 0b000, the pre-scheduled feedback transmission is released. If d == 0b111, the pre-scheduled feedback transmission shall be valid until the ABS commands to release it. |
|     if (d ==0b000){ | | Feedback de-allocation |
|         Polling_deallocation_bitmap | | |
|     } else { | | Feedback allocation |
|         MIMO_feedback_IE_type | 1 | 0b0: feedback allocation for single-BS MIMO operation |
| | | 0b1: feedback allocation for multi-BS MIMO operation |
|         if (MIMO_feedback_IE_type == 0b0){ | | Single-BS MIMO feedback request |
|             MFM_bitmap | 8 | Maximum of 3 distinct concurrent MFM are allowed with MFM_bitmap. If a currently allocated MFM is indicated in the MFM_bitmap, it indicates a deallocation and reallocation of this MFM. ACK Allocation Flag shall be set to 0b1 in this case. |

TABLE 4-continued

| Syntax | Size (bits) | Notes |
|---|---|---|
| Period | 4 | Resource is allocated at frames designated by every short and long period. The short feedback period is p frames. The long feedback period is q superframes. The first allocation shall start two frames later. The frame index is given by i + 2, where i is the index of the frame where the Feedback Polling A-MAP IE is transmitted. The feedback of MIMO feedback modes in MFM_allocation_index is allocated on the short period. The feedback of the transmit correlation matrix is allocated on the long period if q > 0. Short and long period reports shall start at the first allocation. When short and long period feedback reports coincide in the same frame, long period feedback content shall be sent in the same burst. 0b0000: p = 1, q = 0 0b0001: p = 2, q = 0 0b0010: p = 4, q = 0 0b0011: p = 8, q = 0 0b0100: p = 16, q = 0 0b0101: p = 1, q = 1 0b0110: p = 2, q = 1 0b0111: p = 1, q = 2 0b1000: p = 2, q = 2 0b1001: p = 4, q = 2 0b1010: p = 1, q = 4 0b1011: p = 2, q = 4 0b1100: p = 4, q = 4 0b1101: p = 0, q = 1 0b1110: p = 0, q = 4 0b1111: p = 0, q = 16 |
| if (LSB #0 in MFM_bitmap == 1){ | | MFM 0 |
| MaxM$_t$ | 1~2 | |
| Measurement Method Indication | 1 | 0b0: Use the midamble for CQI measurements 0b1: Use pilots in OL region with MaxM$_t$ streams for CQI measurements |
| } | | |
| ... | | |
| if (LSB #7 in MFM_bitmap == 1){ | | MFM 7 |
| MaxM$_t$ | 1~2 | |
| } | | |
| if ((LSB #2 in MFM_bitmap == 1) or (LSB #3 in MFM_bitmap == 1) or (LSB #5 in MFM_bitmap == 1) or (LSB #6 in MFM_bitmap == 1)){ | | MFM 2, 3, 5, 6 |
| Num_best_subbands | 2 | 0b00: report all subbands 0b01: 1 best subband 0b10: min{6, Y$_{SB}$} best subbands 0b11: min{12, Y$_{SB}$} best subbands 1 <= Num_best_subbands <= Y$_{SB}$ |
| } | | |
| ... | | |

In Table 4, MaxM$_t$ specifies a maximum rank to be fed back by the UE for a Single-User MIMO (SU-MIMO) feedback mode(s) for Spatial Multiplexing (SM), or specifies the maximum number of users (or UEs) scheduled on each RU at the BS for a Multi-User MIMO (MU-MIMO) mode(s). MFM indicates a MIMO feedback mode. Various MIMO transmission modes are available in the IEEE 802.16m system and each MIMO transmission mode may be supported by one or more MIMO feedback modes. When the BS allocates a feedback channel to the UE, it also indicates a MIMO feedback mode to the UE. Thus, the UE feeds back information in the indicated MIMO feedback mode. The following table lists MIMO feedback modes and associated MIMO transmission modes.

TABLE 5

| MIMO Feedback Mode | Description and type of RU | Feedback content |
|---|---|---|
| 0 | OL-SU MIMO SFBC/SM (Diversity: DLRU, NLRU) Sounding based CL-SU and MU MIMO | 1. STC Rate 2. Wideband CQI |
| 1 | OL-SU MIMO CDR (Diversity: NLRU) | 1. Wideband CQI |
| 2 | OL-SU MIMO SM (localized: SLRU) | 1. STC Rate 2. Subband CQI 3. Subband Selection |
| 3 | CL-SU MIMO (localized: SLRU) | 1. STC Rate 2. Subband CQI 3. Subband PMI 4. Subband selection 5. Wideband correlation matrix |
| 4 | CL-SU MIMO (Diversity: NLRU) | 1. STC Rate 2. Wideband CQI 3. Wideband PMI 4. Wideband correlation matrix |
| 5 | OL-MU MIMO (localized: SLRU) | 1. Subband CQI 2. Subband Selection 3. MIMO stream indicator |
| 6 | CL-MU MIMO (localized: SLRU) | 1. Subband CQI 2. Subband PMI 3. Subband Selection 4. Wideband correlation matrix |

TABLE 5-continued

| MIMO Feedback Mode | Description and type of RU | Feedback content |
|---|---|---|
| 7 | CL-MU MIMO (Diversity: NLRU) | 1. Wideband CQI 2. Wideband PMI 3. Wideband correlation matrix |

Up to three MIMO feedback modes may be allocated to a UE by the feedback polling A-MAP IE. All MIMO feedback modes allocated to the UE may be de-allocated using Polling deallocation_bitmap included in the feedback polling A-MAP IE.

In Table 4, Num_best_subbands specifies the number of best subbands that the UE is supposed to feedback. If the BS wants the UE to report about all subbands in a bandwidth allocated to the UE, it sets Num_best_subbands to 0b00 in the feedback polling A-MAP IE. If the BS wants the UE to feedback one best subband, it sets Num_best_subbands to 0b01 in the feedback polling A-MAP IE. If Num_best_subbands is set to 0b10, the UE feeds back as many subbands as the smaller between 6 and the total number of subbands across all FPs, $Y_{SB}$ to the BS. If Num_best_subbands is set to 0b11, the UE feeds back as many subbands as the smaller between 12 and the total number of subbands across all FPs, $Y_{SB}$ to the BS.

In response to the feedback polling A-MAP IE requesting feedback of one or more feedback contents, the UE may transmit a MAC control message(s) and header(s) carrying a MIMO measurement/report in a UL grant indicated by the feedback polling A-MAP IE. For example, the UE may transmit a Single BS MIMO FeedBack (SBS-MIMO-FBK), a Multi-BS MIMO FeedBack (MBS-MIMO-FBK), a MIMO feedback header, a correlation matrix feedback header, etc. to the BS according to the number of feedback contents requested by the BS and the number of transmission antennas of the BS. Table 6 below illustrates an exemplary format of a message that the UE transmits to the BS as a response to the feedback polling A-MAP IE. Especially, Table 6 describes a single BS MIMO feedback message. MaxMt, Codebook_subset, Codebook_coordination, Num_best_subbands, long period q, Measurement Method Indication, etc. are indicated by a feedback polling A-MAP IE configured as illustrated in Table 4. The number of transmission antennas in the BS, $N_t$ is signaled by an SFH.

TABLE 6

| Syntax | Size (bits) | Notes |
|---|---|---|
| AAI_SingleBS_MIMO_FBK_Message_Format { MAC Control Message Type If (((MFM == 3) and (q > 0)) or ((MFM == 6) and (q > 0)) or ((MFM == 4) and (q > 0)) or ((MFM == 7) and (q > 0)))){ } | 9 | MFM and long period q are indicated in Feedback Polling A-MAP IEs relevant to currently assigned feedback processes |
| ... | | |
| MFM_bitmap | 4 | Bitmap to indicate the MFMs for which the AMS is sending feedback. It shall be consistent with current feedback allocations corresponding to the MFM requested by Feedback Polling IE. LSB #0: MFM 2 LSB #1: MFM 3 LSB #2: MFM 5 LSB #3: MFM 6 |

TABLE 6-continued

| Syntax | Size (bits) | Notes |
|---|---|---|
| If (LSB #0 in MFM_bitmap == 1){ | | MFM 2 as specified in Feedback Polling A-MAP IE |
|     Best_subbands_index | Variable | |
| } | ... | |
| If (LSB #1 in MFM_bitmap == 1){ | | MFM 3 as specified in Feedback Polling A-MAP IE |
|     Best_subbands_index | Variable | |
| } | ... | |
| If (LSB #2 in MFM_bitmap == 1){ | | MFM 5 as specified in Feedback Polling A-MAP IE |
|     Best_subbands_index | Variable | |
| } | ... | |
| If (LSB #3 in MFM_bitmap == 1){ | | MFM 6 as specified in Feedback Polling A-MAP IE |
|     Best_subbands_index | Variable | |
| } | ... | |
| } | | |

In Table 6, Best_subbands_index is a field being used for feeding back as many best subbands as indicated by the feedback polling A-MAP IE. That is, the Best_subbands_index field is used to report to the BS as many best subbands as indicated by Num_best_subbands from among total subbands. The Best_subbands_index field is for feedback modes used in localized permutation for frequency selective scheduling, MFM2 or MFM3, MFM5 and MFM6. MIMO transmission modes corresponding to MFM2 or MFM3, MFM5 and MFM6 use a Subband LRU (SLRU) as a basic unit for resource allocation.

Referring to Table 6, Best_subbands_index is of a variable length. The UE may determine a predetermined number of, that is, M subbands in good channel state (i.e. M best subbands) and set Best_subbands_index to indicate the M best subbands.

Among $Y_{SB}$ subbands available to the UE, the number of combinations each having M subbands may be expressed as $$N_{subband\_subset} = \binom{Y_{SB}}{M}, \quad [\text{Formula 2}]$$

where $\binom{x}{y}$ is the combination operation

Where $N_{subbands\_subset}$ denotes the number of subsets each having M subbands from among a total set of all available subbands. For example, if $Y_{SB}$ is 10 and the number of subbands to be fed back is 6, there may exist $_{10}C_6=210$ subband combinations that a UE can choose. The UE may sequentially index the 210 possible subband combinations from 0 to 209 according to a predetermined rule and feed back the index of the combination of the selected subbands in Best_subbands_index to the BS. To indicate one of the 210 indexes, eight bits are required. Therefore, the length of the Best_subbands_index field shall be at least 8 bits.

For the same M value, the total number of possible subband combinations varies depending on the value of $Y_{SB}$. Even though the BS requests one best subband, there may be many available $Y_{SB}$ values and thus a set of subband combinations that the UE can select varies with $Y_{SB}$. As a consequence, the number of available subband combinations may vary according to the value of $Y_{SB}$ and/or the value of M, and the length of Best_subbands_index also varies with the value of $Y_{SB}$ and/or the value of M. This means that the Best_subbands_index field should be encoded basically to a variable as illustrated in Table 6.

In the IEEE 802.16m system, a data structure is described irrespective of device structures or languages and thus a MAC control message is encoded through ASN.1 coding such that structured data transmission is possible between applications under different environments. However, ASN.1 coding does not support variables. Accordingly, how to encode the Best_subbands_index field is an issue to be considered for a MIMO feedback message being a kind of MAC control message.

To solve this problem, the field used to indicate best subbands in a MIMO feedback message to be encoded by ASN.1 coding is defined as follows according to an embodiment of the present invention.

TABLE 7

```
BestSubbands ::=            CHOICE {
    full             null
    fiveM                       BestSubbandForFiveM,
    tenM                        BestSubbandForTenM,
    twentyM                     BestSubbandForTwentyM
}
BestSubbandForFiveM ::=     CHOICE {
    best1                       INTEGER (0..3)
}
BestSubbandForTenM ::=      CHOICE {
    best1                       INTEGER (0..9),
    best6                       INTEGER (0..209)
}
BestSubbandForTwentyM ::=   CHOICE {
    best1                       INTEGER (0..20),
    best6                       INTEGER (0..54263),
    best12                      INTEGER (0..293929)
}
```

Table 7 describes the MAC control message on the assumption that 512-FFT, 1024-FFT and 2048-FFT apply to 5, 10 and 20 MHz, respectively and thus up to 4, 10 and 21 subbands can be included in the three respective system bandwidths.

Referring to Table 7, full denotes all subbands, fiveM denotes subbands corresponding to the 5-MHz bandwidth, tenM denotes subbands corresponding to the 10-MHz bandwidth, and twentyM denotes subbands corresponding to the 20-MHz bandwidth. In other bandwidths, fiveM, tenM and twentyM may be used respectively, for 512-FFT, 1024-FFT and 2048-FFT. best1, best6 and best12 denote 1, 6 and 12, respectively as the number of best subbands.

In case of full, null transmission is equivalent to transmission of no signals. Therefore, the field used to indicate best subbands in the MIMO feedback message may be defined as follows.

TABLE 8

```
BestSubbands ::=            CHOICE {
    fiveM                   BestSubbandForFiveM,
    tenM                    BestSubbandForTenM,
    twentyM                 BestSubbandForTwentyM
}
BestSubbandForFiveM ::=     CHOICE {
    best1                   INTEGER (0..3)
}
BestSubbandForTenM ::=      CHOICE {
    best1                   INTEGER (0..9),
    best6                   INTEGER (0..209)
}
BestSubbandForTwentyM ::=   CHOICE {
    best1                   INTEGER (0..20),
    best6                   INTEGER (0..54263),
    best12                  INTEGER (0..293929)
}
```

Referring to Table 7 or Table 8, for the system bandwidth of 10 MHz, for instance, the Best_subbands_index field of the MIMO feedback message may contain a value indicating one of integers 0 to 9 corresponding to best1 or a value indicating one of integers 0 to 209 corresponding to best6.

For a specific frequency bandwidth, $Y_{SB}$ may have a large number of values. For example, $Y_{SB}$ may be computed by $$Y_{SB} = \sum_{m=0}^{3} \frac{L_{SB-CRU,FP_m}}{N_1}$$ [Formula 3]

where $L_{SB-CRU,FPi}$ denotes the number of CRUs allocated on a subband basis in an $i^{th}$ FP, FPi (i≥1), and $N_1$ denotes the number of PRUs in a subband. The number of CRUs allocated on a subband basis in FPi, $L_{SB-CRU,FPi}$ is given by a downlink CRU allocation size, $DCAS_i$. The number of subband-based CRUs in $FP_0$ is determined by $DCAS_{SB,0}$. When a downlink frequency band contains only one FP, $FP_0$, $DCAS_i$ is 0.

The UE may acquire the value of $DCAS_{SB,0}$ for $FP_0$ from an SFH. For example, the BS may signal $DCAS_{SB,0}$ for $FP_0$ in the SFH. $DCAS_{SB,0}$ is equal to or smaller than the number of subbands, $K_{SB,FP0}$ in $FP_0$. The number of subband-based CRUs in $FP_0$, $L_{SB-CRU,FP0}$ may be given by $$L_{SB-CRU,FP_0} = N_1 \cdot DCAS_{SB,0}$$ [Formula 4]

Apart from a case where a downlink frequency band is divided into four FPs of the same length, only one value for $DCAS_i$ (i>0) may be signaled for $FP_i$ (i>0) to the UE. For instance, the UE may receive $DCAS_i$ for FP, (i>0) in an SFH. In this case, the number of subband-based CRUs in FP, (i>0), $L_{SB-CRU,FPi}$ may be given by $$L_{SB-CRU,FP_i} = N_1 \cdot \min\{DCAS_i, K_{SB,FP_i}\}$$ [Formula 5]

As stated before, the number of subbands included in a specific frequency bandwidth, $Y_{SB}$ is affected by an FP configuration, the number of minibands, an FFT size, etc. In accordance with an embodiment of the present invention, a combination of M subbands is selected from among the maximum number of ($N_{sub}$) subbands that can be allocated for a FFT size, not all $Y_{SB}$ values. Therefore, the values of $Y_{SB}$ available for feedback are limited to the number of FFT sizes at most. The UE may set the index of a combination selected from among combinations each having M subbands produced out of a set of $N_{sub}$ subbands in Best_subbands_index field. The number of combinations produced out of $Y_{SB}$ subbands actually allocated to the UE is larger than the total number of combinations produced out of a maximum number of subbands, that is, $N_{sub}$ subbands for a given FFT size, because $Y_{SB}$ is variable. Therefore, when the UE selects subbands based on $N_{sub}$ and feeds back the selected subbands to the BS, a value that can be $N_{subbands\_subset}$ may be reduced.

Meanwhile, in the embodiment of the present invention one or more best subbands are fed back based on $N_{sub}$, the number of bits needed to indicate a combination of M subbands selected from among $N_{sub}$ subbands is used to feed back the best subbands, even though $Y_{SB}$ is smaller than $N_{sub}$. For example, if the maximum number of subbands for 1024-FFT, $N_{sub}$ is 10 and six best subbands should be selected and fed back, the number of combinations each having 6 subbands that can be possibly produced from 10 subbands is 210. Therefore, even though the actual number of subbands, $Y_{SB}$ is smaller than 10, at least 8 bits may be used to indicate one of the 210 combinations.

This embodiment of the present invention reduces the complexity of ASN.1 coding and/or an actual code size. Therefore, the complexity of processing a feedback message at both a UE and a BS is decreased.

For example, it is assumed that 512-FFT, 1024-FFT and 2048-FFT are applied to 5, 10 and 20 MHz, respectively, and thus up to 4, 10, and 21 subbands can be included in the bandwidths of 5, 10 and 20 MHz, respectively. It is also assumed that the BS sets one of all, 1, 6 and 12 to M and transmits a feedback polling A-MAP IE with M to the UE. Because up to four subbands are available in the bandwidth of 5 MHz, one subband or all subbands may be fed back as the best subband(s). For 10 MHz, the maximum number of subbands is 10. Thus all subbands, one subband, or six subbands may be fed back to the BS. For 20 MHz, since the maximum number of subbands is 21, and thus all, one, 6 or 12 subbands may be fed back to the BS. For example, for the bandwidth of 10 MHz, when one best subband is fed back, a total of 10 combinations each including one subband can be produced out of 10 subbands and thus the index of a combination with the one best subband, ranging from 0 to (10−1), is fed back to the BS. When six best subbands are to be fed back, 210 combinations each having six subbands can be produced from 10 subbands and thus the index of a combination with the six best subbands, ranging from 0 to (210−1), is fed back to the BS. The UE may encode the index of the selected combination to the number of bits calculated by.

$$\left\lceil \log_2 \binom{Y_{SB}}{M} \right\rceil,$$ [Formula 6]

where $\binom{x}{y}$ is the combination operation

In the case where a MIMO feedback message is configured based on the definition of a MAC control message illustrated in Table 7 or Table 8, a field indicating a best subband(s), for example, Best_subbands_index of Table 3 may have the following format.

TABLE 9

| Syntax | Size (bits) | Notes | Condition |
|---|---|---|---|
| . . . | | | |
| MFM_bitmap | 8 | Bitmap to indicate the MFMs for which the AMS is sending feedback. It shall be consistent with current feedback allocations corresponding to the MFM requested by Feedback Polling A-MAP IE.<br>LSB #0: MFM 0<br>LSB #1: MFM 1<br>LSB #2: MFM 2<br>LSB #3: MFM 3<br>LSB #4: MFM 4<br>LSB #5: MFM 5<br>LSB #6: MFM 6<br>LSB #7: MFM 7 | |
| If (LSB #2 in MFM_bitmap == 1){ | | MFM 2 as specified in Feedback Polling A-MAP IE | This field shall be omitted for full feedback (full) |
|     Best_subbands_index | 0~19 | Best subband index<br>512 FFT(fiveM): 2 bit<br>1024 FFT(tenM): 4 bit for best 1, 8 bit for best 6<br>2048 FFT(twentyM): 5 bit for best 1, 16 bit for best 6, 19 bit for best 12 | |
| | . . . | | |
| } | | | |
| If (LSB #3 in MFM_bitmap == 1){ | | MFM 3 as specified in Feedback Polling A-MAP IE | This field shall be omitted for full feedback (full) |
|     Best_subbands_index | 0~19 | Best subband index<br>512 FFT(fiveM): 2 bit<br>1024 FFT(tenM): 4 bit for best 1, 8 bit for best 6<br>2048 FFT(twentyM): 5 bit for best 1, 16 bit for best 6, 19 bit for best 12 | |
| | . . . | | |
| } | | | |
| If (LSB #5 in MFM_bitmap == 1){ | | MFM 5 as specified in Feedback Polling A-MAP IE | |
|     Best_subbands_index | 0~19 | Best subband index<br>512 FFT(fiveM): 2 bit<br>1024 FFT(tenM): 4 bit for best 1, 8 bit for best 6<br>2048 FFT(twentyM): 5 bit for best 1, 16 bit for best 6, 19 bit for best 12 | This field shall be omitted for full feedback (full) |
| | . . . | | |
| } | | | |

TABLE 9-continued

| Syntax | Size (bits) | Notes | Condition |
|---|---|---|---|
| If (LSB #6 in MFM_bitmap == 1){ | | MFM 6 as specified in Feedback Polling A-MAP IE | |
|     Best_subbands_index | 0~19 | Best subband index 512 FFT(fiveM): 2 bit 1024 FFT(tenM): 4 bit for best 1, 8 bit for best 6 2048 FFT(twentyM): 5 bit for best 1, 16 bit for best 6, 19 bit for best 12 | This field shall be omitted for full feedback (full) |
|     ... | | | |
| } | | | |
| } | | | |

Referring to Table 7 or Table 8, when all subbands are to be fed back as best subbands, a null signal is transmitted. Therefore, the Best_subbands_index field is 0 bit, which means that the Best_subbands_index field is omitted. Referring to Table 6, a UE may use two bits to indicate one of four subbands, for 512-FFT. The UE may use 4 bits to indicate one of 10 subbands and 8 bits to indicate 6 subbands from among 10 subbands in case of 1024-FFT. For 2048-FFT, the UE may use 5 bits to indicate one subband, 16 bits to indicate 6 subbands and 19 bits to indicate 12 subbands, from among 21 subbands. The UE may determine an FFT size to be used among an FFT size(s) supported by the UE by negotiating with the BS during network entry.

The index r of a subband combination to be fed back by the UE may be defined by $$r = \sum_{i=1}^{M} \binom{S_i}{i} \quad \text{[Formula 7]}$$

where $$\binom{x}{y} = \begin{cases} \binom{x}{y}, & x \geq y \text{ is the extended binomial coefficient} \\ 0, & x < y \end{cases}$$

In [Formula 7], a set $\{S_i, i=1, 2, \ldots, M\}$ ($0 \leq S_i \leq Y_{SB}-1$, $S_i < S_{i+1}$) includes the logical indexes of M selected subbands. According to [Formula 7], the index r being a unique value within the following range is obtained.

$$r \in \left\{0, \ldots, \binom{Y_{SB}}{M} - 1\right\} \quad \text{[Formula 8]}$$

In accordance with an embodiment of the present invention, the index r to be fed back may be determined by substituting $Y_{SB}$ with the maximum number of subbands configurable for a specific FFT size, $N_{sub}$ in [Formula 7] and [Formula 8]. Herein, M may be signaled to the UE in a feedback polling A-MAP IE by the BS.

For example, the number of bits used to feed back M best subbands for a specific FFT size may be defined by the following Formula, irrespective of the value of $Y_{SB}$.

$$\left\lceil \log_2 \binom{N_{sub}}{M} \right\rceil, \quad \text{[Formula 9]}$$

where $\binom{x}{y}$ is the combination operation

Meanwhile, for each FP, $FP_i$, the number of subband-CRUs in $FP_0$ to $FP_i$ is computed by $$X_i = \sum_{m=0}^{i} L_{SB-CRU,FP_m}, \ 0 \leq i \leq 3 \quad \text{[Formula 10]}$$

The subband-LRUs may be indexed as follows.

$$SLRU[k] = SLRU_{FPi}[k-X_{i-1}], \ 0 \leq X_{i-1} \leq k \leq X_i \leq N_i Y_{SB},$$
$$\text{with } 0 \leq i < 3, \ X_{-1} = 0 \quad \text{[Formula 11]}$$

Subbands are indexed according to $$SB[m] = \quad \text{[Formula 12]}$$
$$\left\{ \text{All } SLRU[k] \text{ with indices } k \text{ such that } \left\lfloor \frac{k}{N_1} \right\rfloor = m \right\},$$
with $0 \leq m \leq Y_{SB}$ According to the definition of a MAC control message in Table 7 or Table 9, the number of best subbands to be fed back, M is full, 1, 6 or 12. Therefore, the format of the Num_best_subbands field of Table 1 may be re-defined as follows.

TABLE 10

| Syntax | Size (bits) | Notes |
|---|---|---|
| If ((LSB #2 in MFM_bitmap == 1) or (LSB #3 in MFM_bitmap == 1) or (LSB #5 in MFM_bitmap == 1) or (LSB #6 in | | MFM 2, 3, 5, 6 |

TABLE 10-continued

| Syntax | Size (bits) | Notes |
|---|---|---|
| MFM_bitmap == 1)){ | | |
|     Num_best_subbands | | 0b00: report all subbands |
| | | 0b01: 1 best subband |
| | | 0b10: 6 best subbands |
| | | 0b11: 12 best subbands |
| | | $1 <= \text{Num\_best\_subbands} <= Y_{SB}$ |
| } | | |

Figure 7:
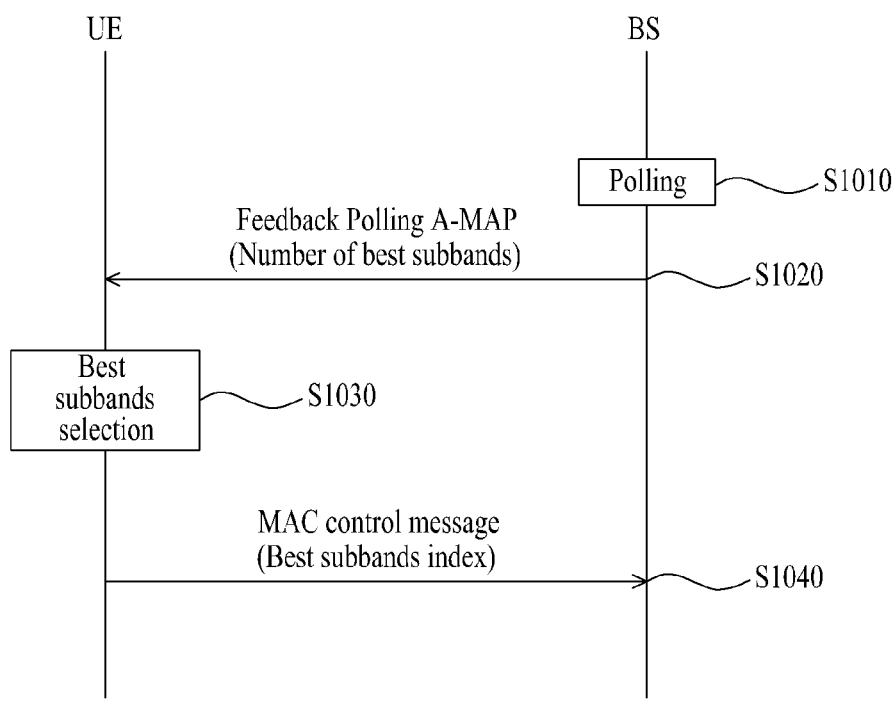
FIG. 7 is a diagram illustrating a signal flow for transmitting feedback information in response to a feedback polling request according to an embodiment of the present invention.

FIG. 7 is a diagram illustrating a signal flow for transmitting feedback information in response to a feedback polling request according to an embodiment of the present invention.

Referring to FIG. 7, a BS generates feedback polling information to schedule feedback transmission of a UE (S1010). The BS may generate feedback polling information specifying the number of best subbands that the UE is supposed to feed back, for example, Num_best_subbands. When the BS generates control information including the number of best subbands, it may adopt the format of Table 4 or Table 10. The BS may transmit the control information in a control region. For instance, the BS may unicast the feedback polling control information in a feedback polling A-MAP IE to the UE.

The UE selects as many subbands in good channel state as indicated by Num_best_subbands received from the BS from among available subbands and generates best subband indication information indicating the selected subbands (S1030). The UE may generate a MAC control message including the best subband indication information according to Table 7 or Table 8 and feed back the MAC control message to the BS (S1040). The UE may encode the best subband indication information in the format of Table 9 in the MAC control message.

According to the present invention, the processor 400b of the BS may control the transmitter 100b of the BS to transmit to the UE a feedback polling request including Num_best_subbands specifying the number of best subbands which the BS wants the UE to feed back (S1020). The BS processor 400b may configure the feedback polling request into a feedback polling A-MAP IE and allocate the feedback polling A-MAP IE to an assignment A-MAP. The BS transmitter 100b may unicast the feedback poling request to the UE in an A-MAP region under the control of the BS processor 400b. The BS processor 400b may configure Num_best_subbands in the format of Table 4 or Table 10, for example.

The receiver 300a of the UE according to the present invention may receive the feedback polling request from the BS and provide it to the processor 400a of the UE. The feedback polling request may be a feedback polling A-MAP IE. The UE receiver 300a may receive the feedback polling request in an A-MAP. The UE processor 400a, which is adapted to control the operation of the UE receiver 300a in interaction with the UE receiver 300a, may control the UE receiver 300a to receive or detect the feedback polling request from the feedback polling A-MAP IE. The UE processor 400a may select as many best subbands as indicated by Num_best_subbands included in the feedback polling request and generates information indicating the selected subbands, for example, a feedback message including Best_subbands_index. If Num_best_subbands indicates all subbands, the UE processor 400a may configure a feedback message without Best_subbands_index by configuring Best_subbands_index field with 0 bit. The UE processor 400a may encode Best_subbands_index, for example, in the format of Table 9 in the feedback message. The UE processor 400a may control the UE transmitter 100a to transmit the feedback message to the BS. The UE transmitter 100a may transmit the feedback message to the BS under the control of the UE processor 400a (S1040).

While the present invention has been described in the context that M is one of full, 1, 6, and 12, M may be any other integer value. Thus, the BS may transmit a feedback polling A-MAP IE including Num_best_subbands set to a value different from full, 1, 6 and 12 to the UE. The UE selects as many best subbands as indicated by Num_best_subbands from among $N_{sub}$ subbands and feeds back to the BS the index of a combination with the best subbands, among combinations each having M subbands which are produced out of the $N_{sub}$ subbands. $N_{sub}$ is a maximum number of subbands that can be allocated for a given FFT size.

As is apparent from the above description, the present invention reduces the total number of subband combinations from which a UE is to select a subband combination for feedback.

Furthermore, since feedback information coding is simplified, the complexity of a UE and a BS is reduced.

The embodiments of the present invention can be applied to a BS, a UE, or other communication devices in a wireless communication system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting, by a user equipment (UE), feedback information to a base station (BS) in a wireless communication system, the method comprising:
   receiving a feedback polling request from the BS; and
   transmitting a feedback message in response to the feedback polling request to the BS,
   wherein the feedback polling request includes number information indicating a number of subbands, 'M',
   the feedback message includes indication information for indicating 'M' best subbands,
   wherein the number information indicates one of 'all', '1', '6' and '12', and the feedback message includes no indication information for indicating the 'M' best subbands when the number information indicates 'all',
   wherein the indication information indicates the 'M' best subbands from among 'N' subbands by indicating a combination of the 'M' best subbands from among '$_NC_m$' combinations, where 'N' is a maximum number of subbands that can be allocated, and
   wherein 'N' depends on a Fast Fourier Transform (FFT) size, and 'N' is 4, 10, and 21 for 512-FFT, 1024-FFT, and 2048-FFT, respectively.

2. The method according to claim 1, wherein the indication information has a size of Ceil$\{\log_2(_NC_M)\}$.

3. A user equipment (UE) for transmitting feedback information to a base station (BS) in a wireless communication system, the UE comprising:
    a receiver configured to receive a downlink signal from the BS;
    a transmitter configured to transmit an uplink signal to the BS; and
    a processor, operatively coupled to the receiver and the transmitter, configured to control the receiver and the transmitter,
    wherein the processor is configured to control the receiver to receive a feedback polling request from the BS and control the transmitter to transmit a feedback message in response to the feedback polling request to the BS, and
    wherein the feedback polling request includes number information indicating a number of subbands 'M', and
    the feedback message includes indication information for indicating 'M' best subbands, and
    wherein the number information indicates one of 'all', '1', '6' and '12', and the feedback message includes no indication information for indicating the 'M' best subbands when the number information indicates 'all',
    wherein the indication information indicates the 'M' best subbands from among 'N' subbands by indicating a combination of the 'M' best subbands from among '$_NC_M$' combinations, where 'N' is a maximum number of subbands that can be allocated, and
    wherein 'N' depends on a Fast Fourier Transform (FFT) size, and 'N' is 4, 10, and 21 for 512-FFT, 1024-FFT, and 2048-FFT, respectively.

4. The UE according to claim 3, wherein the processor is configured to encode the indication information to a size of Ceil$\{\log_2(_NC_M)\}$.

5. A method for receiving, by a base station (BS), feedback information from a user equipment (UE) in a wireless communication system, the method comprising:
    transmitting a feedback polling request to the UE; and
    receiving a feedback message from the UE in response to the feedback polling request,
    wherein the feedback polling request includes number information indicating a number of subbands, 'M',
    wherein the feedback message includes indication information for indicating 'M' best subbands, and
    wherein the number information indicates one of 'all', '1', '6' and '12', and the feedback message includes no indication information for indicating the 'M' best subbands when the number information indicates 'all',
    wherein the indication information indicates the 'M' best subbands from among 'N' subbands by indicating a combination of the 'M' best subbands from among '$_NC_m$' combinations, where 'N' is a maximum number of subbands that can be allocated, and
    wherein 'N' depends on a Fast Fourier Transform (FFT) size, and 'N' is 4, 10, and 21 for 512-FFT, 1024-FFT, and 2048-FFT, respectively.

6. The method according to claim 5, wherein the indication information has a size of Ceil$\{\log_2(_NC_M)\}$.

7. A base station (BS) for receiving feedback information from a user equipment (UE) in a wireless communication system, the BS comprising:
    a transmitter configured to transmit a downlink signal to the UE;
    a receiver configured to receive an uplink signal from the UE; and
    a processor, operatively coupled to the receiver and the transmitter, configured to control the receiver and the transmitter,
    wherein the processor is configured to control the transmitter to transmit a feedback polling request to the UE and control the receiver to receive a feedback message from the UE in response to the feedback polling request,
    wherein the feedback polling request includes number information indicating a number of subbands 'M',
    wherein the feedback message includes indication information for indicating 'M' best subbands,
    wherein the number information indicates one of 'all', '1', '6' and '12', and the feedback message includes no indication information for indicating the 'M' best subbands when the number information indicates 'all',
    wherein the indication information indicates the 'M' best subbands from among 'N' subbands by indicating a combination of the 'M' best subbands from among '$_NC_M$' combinations, where 'N' is a maximum number of subbands that can be allocated, and
    wherein 'N' depends on a Fast Fourier Transform (FFT) size, and 'N' is 4, 10 and 21 for 512-FFT, 1024-FFT and 2048-FFT, respectively.

8. The BS according to claim 7, wherein the indication information has a size of Ceil$\{\log_2(_NC_m)\}$.

* * * * *